A. SHALER.

Whiffletree.

No. 99,357. Patented Feb. 1, 1870.

Witnesses:
A. W. Almqvist
Alex F. Roberts

Inventor:
Alex Shaler
Per [signature]
Attorneys.

United States Patent Office.

ALEXANDER SHALER, OF NEW YORK, N. Y.

Letters Patent No. 99,357, dated February 1, 1870.

IMPROVEMENT IN DEVICE FOR CONNECTING HORSES TO VEHICLES.

The Schedule referred to in these Letters Patent and making part of the same.

*To all whom it may concern:*

Be it known that I, ALEXANDER SHALER, of the city, county, and State of New York, have invented a new and improved Device for Connecting Horses to Vehicles; and I do hereby declare that the following is a full, clear, and exact description thereof, which will enable others skilled in the art to make and use the same, reference being had to the accompanying drawings, forming part of this specification, in which—

My invention has for its object to furnish an improved device for connecting horses quickly and securely to the thills of vehicles, in such a way as not to require tugs or traces, and in such a way that the horse may be instantly detached from the vehicle, should he be frightened or fall; and It consists in the construction and combination of the various parts of the device, as hereinafter more fully described.

A represents the forward part of one of the thills of a vehicle, to the inner side of which, in such a position as to be just behind the horse's fore-shoulder, is attached a plate, B, having ears or sockets C, one or more, formed upon it, to receive the eyes D of the harness-plate E.

Figure 1:
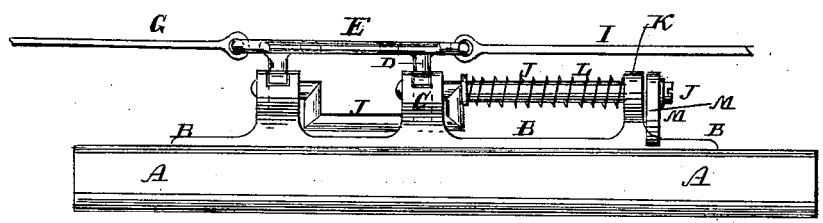
Figure 1 is a top view of my improved device.
Figure 3:
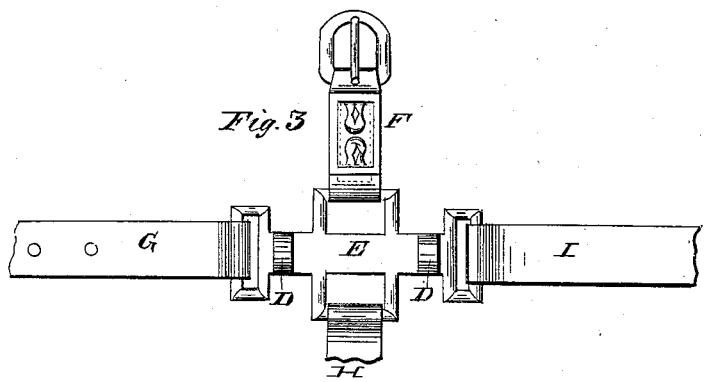
Figure 3 is an outer side view of the plate to which the straps of the harness are attached.

The harness-plate E may be formed with loops upon its edges, to receive the back-strap F, the hame-tug G, the belly-band H, and the breech-strap I, as shown in figs. 1 and 3; or the plate E may be made without loops, and may be covered, except the eyes D, with leather, to which the straps F G H I may be attached.

Figure 2:
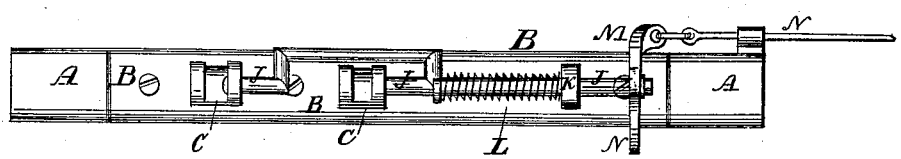
Figure 2 is an inner side view of a thill, and the part of the device attached thereto.

The eyes D of the plate E fit into the sockets of the ears C, in which they are pivoted by the ends or branches of the sliding-rod J, as shown in figs. 1 and 2.

The rod J, when more than one ear C is used, is made with an offset, as shown in figs. 1 and 2, so that its action will not be impeded by said ears.

The rear ends of the rod J pass through a guide-eye, K, attached to the rear part of the plate B, and the said rod is held forward, to couple the eyes D and ears C to each other, by the coiled or equivalent spring L, connected with the rear part of the said rod.

To the end of the rod J that projects in the rear of the eye K, is securely and rigidly attached a thumb-piece, M, for convenience in drawing back the rod J, for the attachment of the eye-plate D E.

To the thumb-piece M is also attached the forward end of the strap or cord N, which runs back through guides attached to the thill A, to or nearly to the cross-bar of the thills, and thence up to the front of the vehicle, where it is secured in such a position that it may be readily reached and operated by the driver, to detach the horse in case of accident.

The number of ears C and eyes D must depend upon the weight of the loads and the character of the vehicle. For light wagons and carriages, one will be sufficient, but two or more may be used, as required.

By this construction, no tugs or traces are required, and the horse may be instantly attached and detached.

Another advantage of this construction is that should the horse fall, he may be quickly and readily detached, without its being necessary to cut the harness, or even to stop to unbuckle any buckles.

Having thus described my invention,

I claim as new, and desire to secure by Letters Patent—

1. The combination of the thill-plate B, one or more ears C, sliding rod J, coiled or equivalent spring L, eye K, thumb-piece M, and harness-plate E, having one or more eyes D formed upon it, with each other, substantially as herein shown and described, and for the purpose set forth.

2. The combination of the strap or cord N with the thumb-piece M of the device B C D E J K L M, and with the thill A, substantially as herein shown and described, and for the purpose set forth.

ALEXANDER SHALER.

Witnesses:
GEO. W. MABEE,
JAMES T. GRAHAM.